March 22, 1932. T. C. DELAVAL-CROW 1,850,170
ANTIFRICTION BEARING AND SEAL
Filed May 20, 1930

INVENTOR:
THOMAS C. DELAVAL-CROW,
BY
HIS ATTORNEY.

Patented Mar. 22, 1932

1,850,170

UNITED STATES PATENT OFFICE

THOMAS C. DELAVAL-CROW, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

ANTIFRICTION BEARING AND SEAL

Application filed May 20, 1930. Serial No. 453,944.

This invention relates to antifriction bearings and seals and comprises all the features of novelty herein disclosed. An object of the invention is to provide an improved sealing device for preventing leakage of lubricant or foreign matter between a bearing and the frame or other member which supports the bearing. Another object is to provide an improved mounting for unit-handling antifriction bearings and seals.

To these ends and to improve generally and in detail upon devices of this character, the invention also consists in the various matters hereinafter described and claimed. In its broader aspects, the invention is not necessarily limited to the specific construction selected for illustrative purposes in the accompanying drawings in which—

Figure 1:
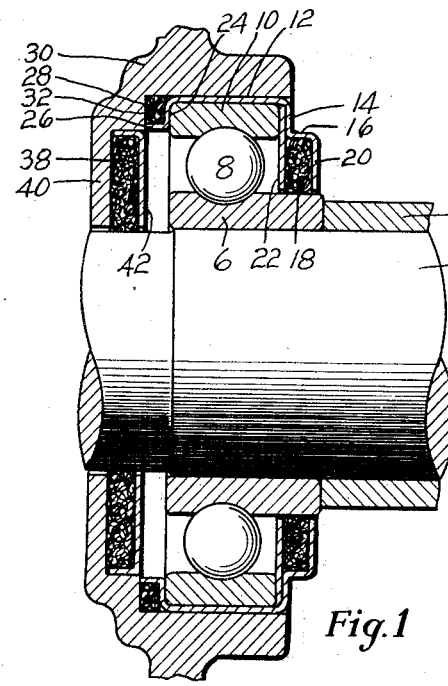
Fig. 1 is a cross sectional view of a sealed up bearing and its mounting.

The numeral 6 indicates the inner race ring of an antifriction bearing herein shown as having a row of balls 8 and an outer race ring 10. A sheet metal plate or shell 12 encloses the outer race ring, one end of the plate or shell having a bent-in wall 14 and a cupped portion or axial extension 16, the latter enclosing a sealing washer 18 held between a terminal flange 20 and a separate plain washer 22 which is clamped between the end of the outer race ring and the bent-in wall 14. The sealing washer runs on a finished cylindrical face of the inner race ring which is extended axially beyond the outer race ring and through the sealing washer and its metal container. The other end of the shell 12 has a flange 24 bent down against the opposite end of the outer race ring to hold the parts assembled into a unit-handling structure. The flange terminates in an axial extension 26 which is preferably substantially cylindrical to enter and hold a sealing washer 28 of felt or the like which extends at least as far as the periphery of the shell 10 but is compressed to the outer periphery of the shell when the bearing is installed in a bearing seat.

According to one typical way of mounting the bearing, the plate or shell 12 is supported by the bore of a casing 30 having an annular shoulder 32 acting as an abutment for the axial extension 26 of the plate or shell 12 when the bearing is pushed into its seat. The sealing washer 28 is under some compression between the shoulder 32 and the flange 24 as well as between the axial extension 26 and the bore of the casing 30. It prevents leakage of lubricant from the bearing to the outside of the shell, such as might tend to promote undesired rotation of the smooth shell in the smooth casing bore, and the pressure of the washer against the casing wall further creates a frictional resistance which is effective in preventing such rotation. The inner race ring 6 is supported by a shaft 34, a suitable shoulder or spacer 36 on the shaft acting as an abutment. If the shaft projects through the casing, the joint is conveniently sealed, as by a sealing washer 38 held between a flange 40 of the casing and a flanged retaining washer 42. Lubricant is thus sealed by the washers 18 and 38 against escape from the bearing in either axial direction, and the washer 28 prevents escape of lubricant around the outside of the bearing. The possibility of such leakage, and a consequent turning of the bearing, arises because the bearings are frequently mounted in the casing bore with a push or sucking fit and so are not tightly held.

Figure 2:
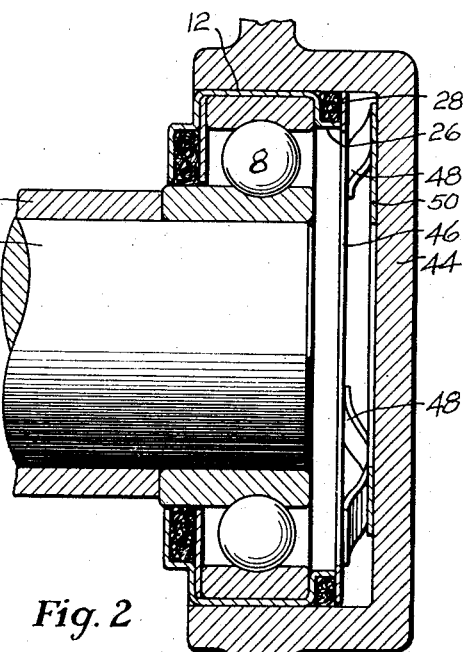
Fig. 2 is a similar view of a suitable companion mounting for the device of Fig. 1 and Figs. 3 and 4 are cross sectional views of modified forms of the invention.

A typical companion mounting for that of Fig. 1 is illustrated in Fig. 2 wherein the frame or casing has a closed end wall 44 extending across the end of the shaft. The bearing and seal is desirably axially movable in the bore, a washer 46 engaging the flange 26 and the sealing washer 28 carried thereby while spring fingers 48 on a washer 50 press the outer race ring in one direction thus keeping the companion outer race ring pressed against its abutment and compensating for inaccuracies or for expansion of the shaft.

Figure 3:
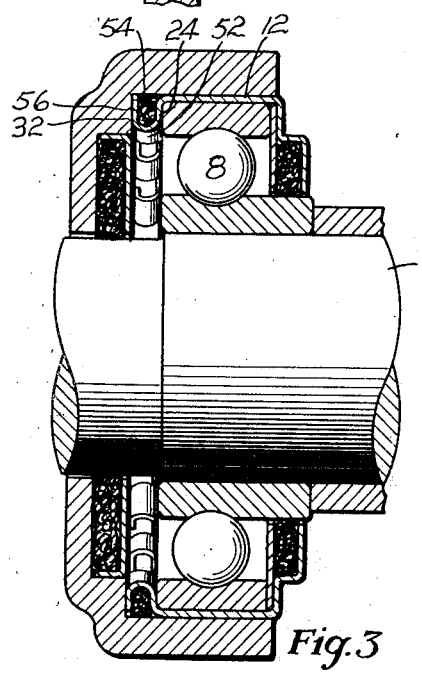

Fig. 3 is similar to Fig. 1 but the flange 24 of the shell 12 has a resilient extension comprising a series of curved fingers 52 entering a sealing washer 54 and terminating in outwardly bent lugs 56 which retain the sealing washer positively on the bearing, the lugs engaging the abutment shoulder 32 yieldingly and compressing the sealing washer somewhat if axial pressure is transmitted to the bearing through the shaft 34.

Figure 4:
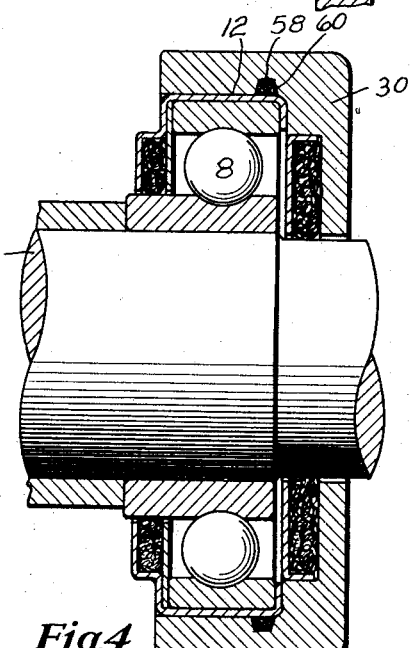

In Fig. 4, the seal between the casing 30 and the bearing or its shell 12 comprises a felt washer 58 set in an annular recess 60 of the casing bore and frictionally engaging the shell 12 when the washer is compressed to the diameter of the casing seat by the insertion of the bearing.

I claim:

1. In a unit-handling antifriction bearing and seal, a bearing comprising an inner race ring, an outer race ring and a row of rolling elements between the rings, a sealing device carried by one end of the bearing to close the space between the outer race ring and the inner race ring, and a sealing device carried by the other end of the bearing for sealing the outer race ring in a bearing seat; substantially as described.

2. In a unit-handling antifriction bearing and seal, a bearing comprising an inner race ring, an outer race ring and a row of rolling elements between the rings, a shell enclosing the outer race ring and having means at one end for sealing the space between the outer race ring and the inner race ring, the shell having an extension at the other end, and a sealing device carried by said extension for sealing the shell in a bearing seat; substantially as described.

3. In a unit-handling antifriction bearing and seal, a bearing comprising an inner race ring, an outer race ring and a row of rolling elements between the rings, a shell enclosing the outer race ring and having a flange bent inwardly at one end of the outer race ring, the flange terminating in an extension projecting axially beyond the bearing, and a sealing washer fitting the outside of said extension; substantially as described.

4. In a unit-handling antifriction bearing and seal, a bearing comprising an inner race ring, an outer race ring and a row of rolling elements between the rings, a shell enclosing the outer race ring, each end of the shell having an axial extension projecting away from the outer race ring, a sealing washer carried inside of one axial extension, and a sealing washer carried on the outside of the other axial extension; substantially as described.

5. In a bearing mounting, a bearing comprising an inner race ring, an outer race ring and a row of rolling elements between the rings, a casing having a seat for the bearing, a plate carried near one end of the outer race ring and making a close joint with the inner race ring, and a sealing washer near the other end of the bearing and having a surface compressed to the diameter of the casing seat to prevent leakage between the seat and the outside of the bearing; substantially as described.

6. In a bearing mounting, a bearing comprising an inner race ring, an outer race ring and a row of rolling elements between the rings, a support having a seat for the bearing and an abutment at the end of the seat, a plate carried by the bearing and projecting axially therefrom to engage the abutment, and a yieldable washer interposed between the seat and the plate; substantially as described.

In testimony whereof I hereunto affix my signature.

THOMAS C. DELAVAL-CROW.